Jan. 19, 1965  J. HAMPL  3,166,756
MOTION PICTURE CAMERA WITH ROTATABLE
AND REMOVABLE CASSETTE
Filed Dec. 22, 1961  4 Sheets-Sheet 1

INVENTOR.
Jan Hampl
BY

Jan. 19, 1965

J. HAMPL 3,166,756

MOTION PICTURE CAMERA WITH ROTATABLE
AND REMOVABLE CASSETTE

Filed Dec. 22, 1961

INVENTOR.
Jan Hampl

BY Richard ___
agt

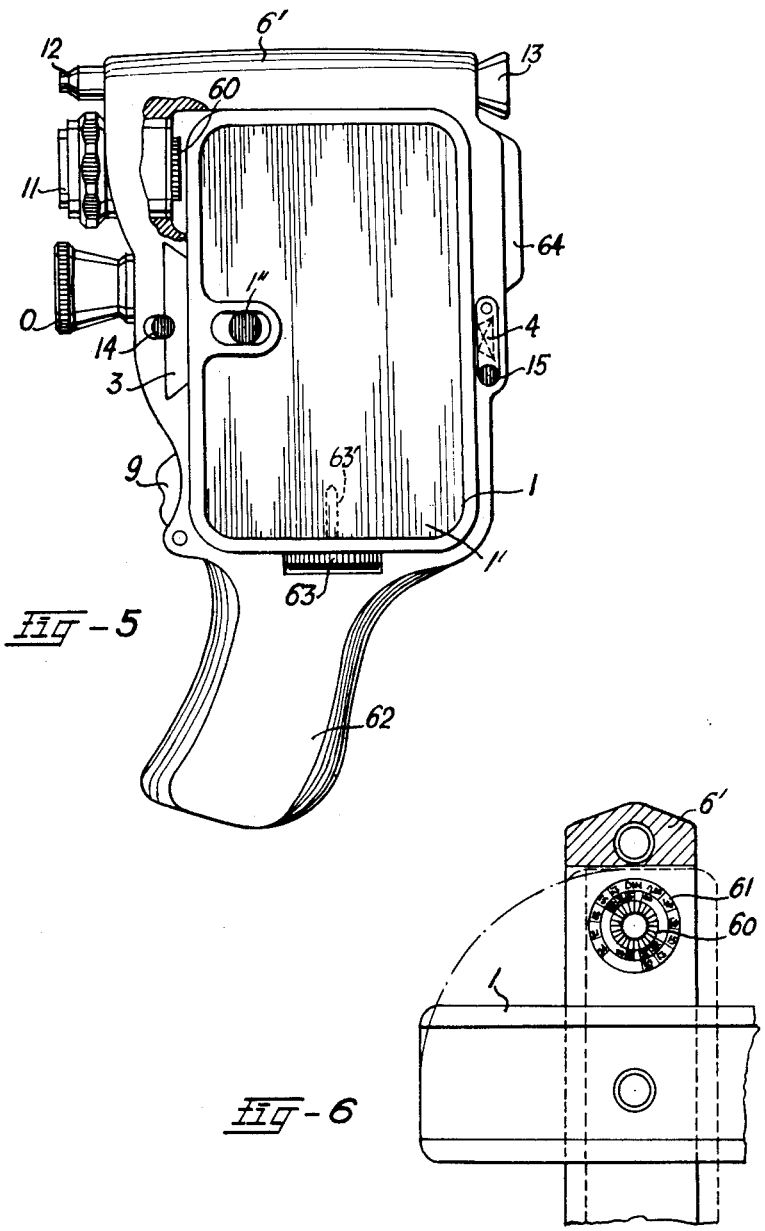

UNITED STATES PATENT OFFICE 3,166,756
Patented Jan. 19, 1965

3,166,756
MOTION PICTURE CAMERA WITH ROTATABLE AND REMOVABLE CASSETTE
Jan Hampl, Prerov, Czechoslovakia, assignor to Meopta, narodni podnik, Prerov, Czechoslovakia
Filed Dec. 22, 1961, Ser. No. 161,646
Claims priority, application Czechoslovakia, Dec. 27, 1960, 7,755/60
17 Claims. (Cl. 352—78)

This invention relates to motion picture cameras, and particularly to a motion picture camera employing film on which two sequences of frames are exposed in two longitudinal juxtaposed rows, the frames of one row being exposed first, and the frames of the other row being exposed thereafter. After exposure, the film is slit lengthwise and the two rows of frames may be spliced together for sequential showing.

The so-called 8 millimeter motion picture film which is widely employed by amateur motion picture photographers is originally a double width film, that is, having a width of 16 millimeters on which two rows of frames are sequentially exposed. In ordinary 8 mm. motion picture cameras, a spool of film is exposed and is transferred in the process from an original spool to a take-up spool. The camera is then opened, the position of the spools is reversed, and the film is again exposed while being returned to the original spool.

Various devices have previously been suggested for avoiding double handling of the film during exposure. In known devices of this kind, the direction of film movement is reversed after exposure of one row of frames, the optical axis is shifted by moving the lens system until the picture projected by the objective falls on the previously unexposed half of the film, and the camera is inverted while the second row of frames is exposed.

The known devices require duplication of several elements of the camera in order to make the controls of the camera available to the photographer's hand and eye in the same manner during exposure of both halves of the film. At least two release buttons for the film drive and two viewfinders are necessary. If the camera has automatic features, the structural complexities arising from the duplicate controls may seriously impair the reliability of operation of the camera, and its weight and bulk may be increased substantially. In order to minimize the operations required to be performed by the photographer when reversing the direction of film movement after exposure of one half of the film, some known devices of the aforedescribed type provide a coupling between the lens barrel and the film drive which permits shifting the camera from exposure of one film side to exposure of the other side by a single operation, but at the cost of further complexity, weight, and bulk of the apparatus.

An added shortcoming of the known motion picture cameras which avoid handling the film between the exposures of the two juxtaposed rows of frames is the fact that the camera has to be inverted for taking the second row of frames. A small camera of the type here discussed should be designed to fit comfortably into the photographer's hand and preferably to provide an abutment surface for his forehead so that the camera may be held steady during exposure while the object photographed is viewed through the viewfinder. It is a difficult task to make a motion picture camera housing to conform to this requirement even if the camera is to be held in one position only. When the camera is also to be operated in an upside down position one half of the time, a compromise is necessary in which two not entirely satisfactory positions are made available instead of one which could give greater ease and steadiness of operation.

The object of the present invention is a motion picture camera which permits the two rows of juxtaposed frames of the 8 millimeter type on a motion picture film to be sequentially exposed, yet avoids much of the duplication of controls and other features inherent in the known devices.

A more specific object is the provision of such a camera the weight and bulk of which is not materially increased over the conventional manual camera of the same frame size.

A further object is the provision of a camera of the type described which is simple in its mechanism and inherently reliable in its operation.

An additional object is the provision of such a camera which may be produced to high precision standards at relatively low cost.

With these and other objects in view, the motion picture camera of this invention consists of two separate basic elements. One of the elements is a support member carrying the lens and associated parts of the camera which define the optical axis of the same. The other basic element is a cassette member in which the film is contained during its exposure. The cassette member also holds the film drive and associated movable devices and is pivotally mounted on the support member for movement about an axis of rotation which extends in a direction determined by the optical axis. The cassette member may pivot about its axis of rotation between two operative positions which are angularly offset relative to each other about the last-mentioned axis, for example, by 180°. The film drive includes actuating means which move the film in the cassette in a predetermined path which is basically conventional. A portion of this path defines a gate plane which transversely intersects both the optical axis of the lens system and the axis of rotation of the cassette member. The points of intersection of the two axes with the gate plane are spaced from each other.

Other features and many of the attendant advantages of this invention will be readily appreciated as the same becomes better understood by reference to the following detailed description when considered in connection with the accompanying drawings in which:

FIG. 5 is a side elevational view of a modification of the camera of FIG. 1, portions of the structure being broken away to reveal elements of the exposure control arrangement; and FIG. 6 is a fragmentary rear elevational view, partly in section, of the camera shown in FIG. 5.

Figure 1:
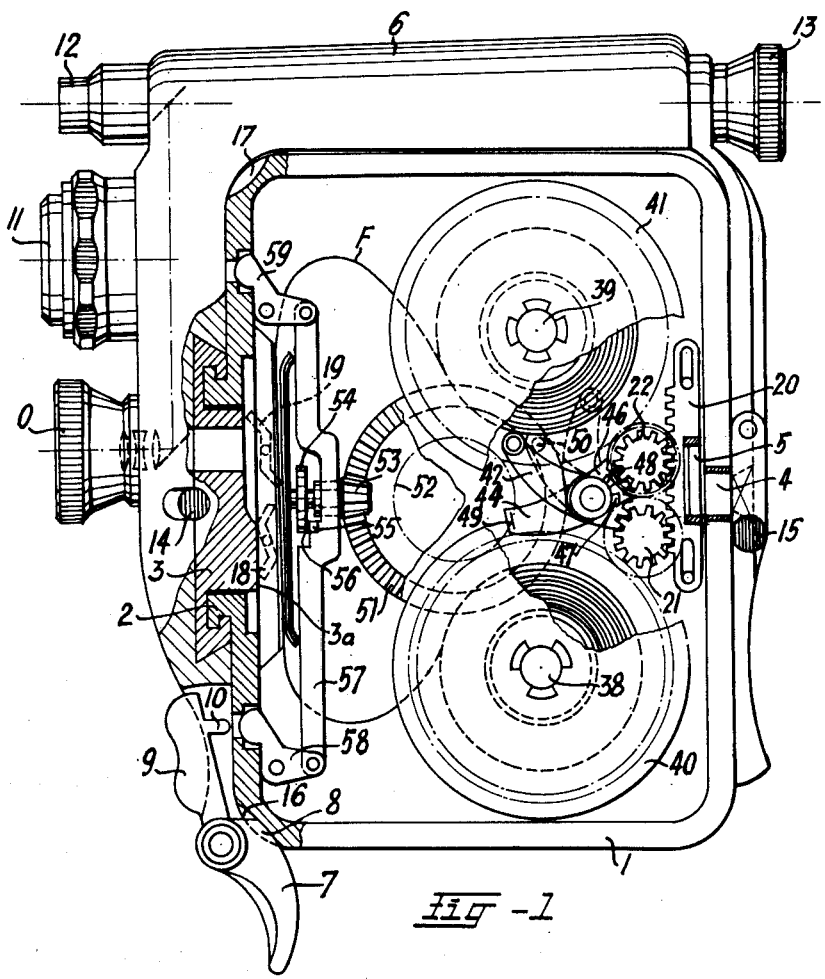
FIG. 1 shows a camera of the invention in side elevation with the cover of the cassette member removed and other portions of the structure broken away better to reveal the working elements of the camera.
Figure 4:
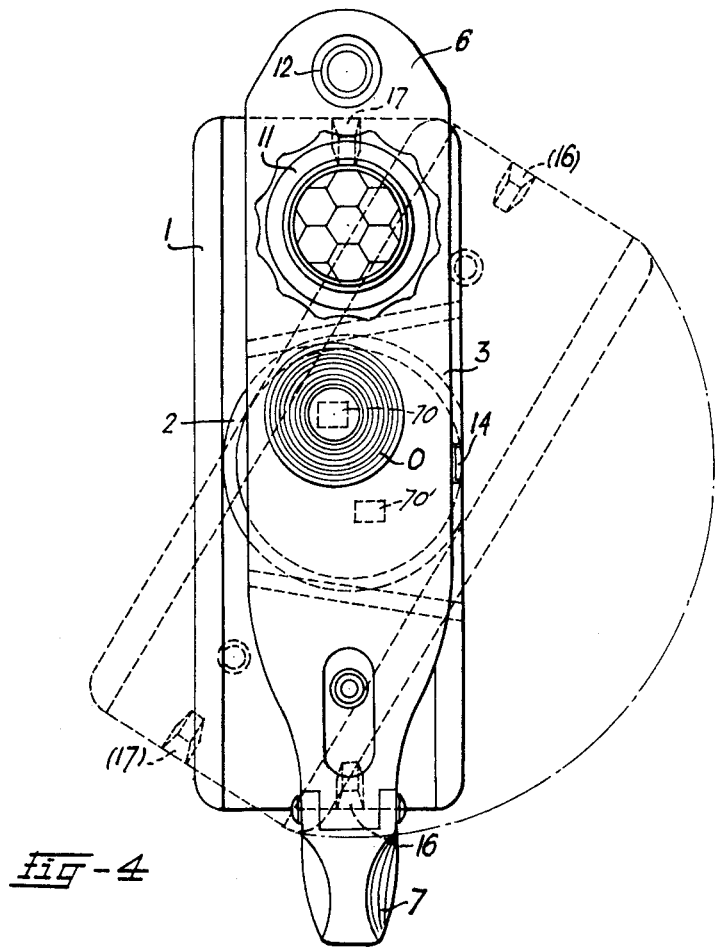
FIG. 4 shows the camera of FIG. 1 in front elevation.

Referring now to the drawing in detail, and initially to FIG. 1, there is shown an amateur motion picture camera for use with conventional film having a total width of 16 millimeters divided into two rows of 8 millimeter frames, and being supplied on standard spools holding 25 feet of film. The body of the camera consists of two basic elements, a support member or frame 6 and a cassette 1. The cassette 1 is pivotally mounted on the frame 6 by means of a trunnion 2 and a pin 4. The trunnion 2 is rotatable on a bearing member 3 which is seen in FIG. 4 to be wedge shaped. The member 3 is horizontally slidably inserted in the front wall of the camera frame 6 which has a dovetailed recess matingly receiving the bearing member 3. The pin 4 is similarly engaged in the rear wall of the camera frame 6, and the cassette 1 is journaled on the pin 4.

For the sake of convenient description, the camera will be described with reference to its normal operating position illustrated in FIG. 1, and as viewed by a photographer using the camera.

The front wall of the camera frame 6 thus is the wall which carries a lens barrel and lens system jointly designated by reference character O. The top of the camera frame 6 carries a viewfinder including an objective 12 which projects beyond the afore-mentioned front wall, and an eye piece 13 which projects beyond the rear wall. The camera is viewed in FIG. 1 from the left. The front wall of the camera frame 6 also carries a photoelectric cell 11 which is shielded to receive light only from the direction of the object toward which the lens system O is directed, as is conventional. It will be understood that the cell 11 is part of a conventional exposure meter for indicating to the photographer the extent to which an iris diaphragm (not shown) in the lens system O should be opened or closed for proper control of the amount of light impinging on the film strip.

A release button or arm 9 projects from a slot at the bottom of the front wall of the camera frame 6. The button 9 is hingedly attached to the camera frame. It carries an integral pin 10 which is driven into the interior of the cassette 1 when the button 9 is depressed. The button is urged outward of the camera by a non-illustrated spring. A locking lever 7 is independently rotatable about the axis of rotation of the button 9 and has a detent portion 8 which engages a corresponding slot 16 in the bottom front edge of the cassette 1. The top front edge of the cassette 1 is formed with a similar slot 17 which may be engaged by the detent portion 8 of the locking lever 7 when the cassette 1 is rotated 180° from the position illustrated in FIG. 1 about the axis of rotation which is defined by the trunnion 2 and the pin 4. The two positions of the cassette 1 in which the slots 16, 17 are engaged by the detent portion 8 of the locking lever 7 are referred to hereinafter as the operative positions of the cassette.

While rotation of the cassette 1 about its axis is prevented by the locking lever 7, the cassette is secured against lateral movement by spring loaded catches 14 and 15. The catch 14 which is mounted on the front wall of the camera frame 6 and is accessible from the outside engages the bearing member 3. The catch 15 is mounted on the rear wall of the frame 6 and laterally confines the dovetailed portion of the pin 4, holding it in the conforming dovetailed groove of the rear wall. When the catches 14, 15 are pushed aside, the cassette 1 may be removed from the frame 6 together with the bearing member 2 and the pin 4.

The cassette contains two keyed shafts 38, 39 on which film spools 40, 41 are supported. A film F has two end portions respectively wound on the spools. A central portion of the film F forms a loop which is moved through the beam of light projected by the lens system O by claws 18, 19 in a manner known in itself. The claws are pivotally mounted on the cassette 1 and rotate with it. They cammingly engage a recess in the stationary bearing member 3 which causes them alternatingly to engage the perforations of the film F depending on the position of the cassette 1. The bearing member 3 has an opening about the optical axis of the camera to admit light from the lens system O to the film as it is moved stepwise past the opening.

The camera is equipped with the usual rotary shutter which moves in synchronism with the claws to expose the film to light while it stands still, and to protect it against exposure while it is being moved stepwise by the length of one frame. Since this mechanism is well known, it will not be described in detail and has not been shown in the drawing. The shutter movement and the stepwise movement of the film portion which is in the gate plane behind the lens system are actuated by a spring motor which will be described hereinafter in more detail.

The spring motor drives a spur gear 52 which is fastened on a common shaft with a large bevel gear 51. A small bevel gear 53 meshes with the gear 51, and movement of the shutter and of the claws is derived from the shaft of the small bevel gear in a manner not further illustrated in order not to crowd the drawing. The last-mentioned shaft also carries a disc 54 from a radial face of which a pin 55 projects in an axial direction. When the camera is not operated, the pin 55 abuts under the pressure of the spring motor against a lug 56 on a bar 57. The two ends of the bar are hingedly connected to respective arms of two short two-armed levers 58, 59 which are pivotally mounted on parallel pins fixed in a side wall of the cassette 1. The other arms of the levers 58, 59 are aligned with respective openings near the top and bottom front edges of the cassette 1. The levers 58, 59 are spring-biased to assume the position illustrated in FIG. 1. When the release button 9 is pressed, its pin 10 enters the opening adjacent the lever 58 and pivots it in such a manner that the lug 56 releases the pin 55 and permits the spring motor to operate. When the cassette 1 is pivoted into its other operative position, the pin 10 cooperates in an analogous manner with the lever 59.

The mechanism by means of which the film F is wound and unwound on the spools 40, 41 will now be described with reference to FIGS. 1 and 2.

The pin 4 which is fixedly held in the rear wall of the cassette 1 by the catch 15 fixedly carries an eccentric circular disc 5. A rack 20 is longitudinally slidably mounted on the cassette 1 and has an opening the length of which conforms to the diameter of the disc 5. When the cassette 1 rotates about the common axis of the pin 4 and of the trunnion 2, the rack is displaced longitudinally by its engagement with the disc 5.

The rack 20 is in permanent simultaneous meshing engagement with the axially elongated teeth of two pinions 21 and 22. The pinions are internally threaded, one being equipped with a right-hand thread of relatively great pitch, the other one with a corresponding left hand thread. The internal threads of the pinions 21, 22 engage correspondingly threaded portions of respective pins 23, 24 which are fixedly fastened to a sidewall of the cassette 1. Two meshingly engaged spur gears 25, 26 are rotatable on respective smooth cylindrical portions of the pins 23, 24. They are linked with the pinions 21, 22 respectively for common axial movement on the pins 23, 24, but are rotatable independently of the pinions. The radial end faces of the gears 25, 26 carry coupling claws 27, 28 which are engageable with corresponding coupling claws 29, 30 on two spur gears 31, 32. The latter gears are also rotatable on the pins 23, 24.

Figure 2:
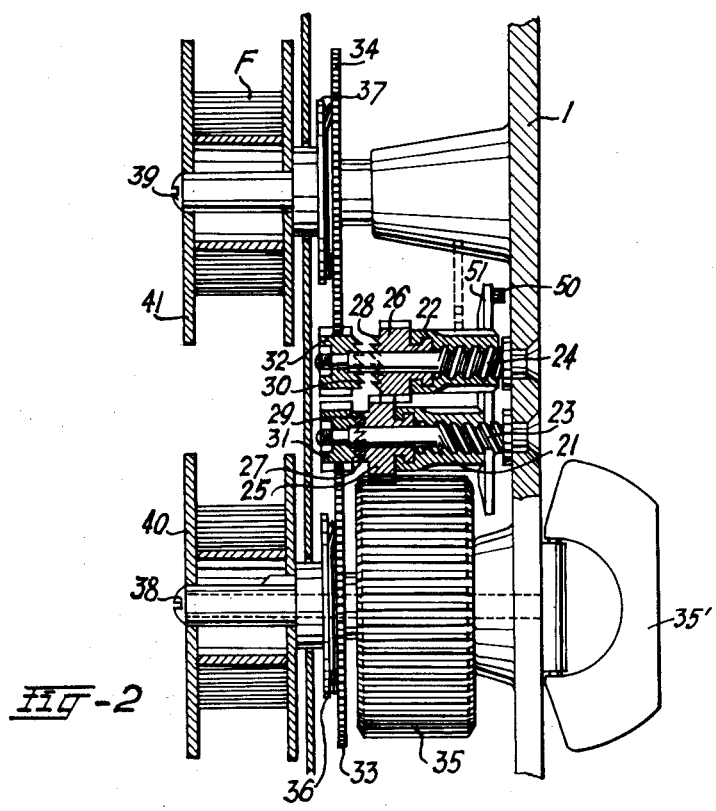
FIG. 2 illustrates a detail of the camera of FIG. 1 in rear elevation, partly in section, and on an enlarged scale.

In the position of the cassette 1 illustrated in FIG. 1 the rack 20 holds the several elements mounted on the pins 23, 24 in the position shown in FIG. 2 in which the pinion 22 is moved away from the corresponding spur gear 32, and the coupling formed between the claws 28 and 30 is open. The pinion 21 is in its terminal axial position near the spur gear 31, and the claws 27 and 29 connect the gears 25 and 31. The condition of engagement of the claw couplings is reversed when the cassette 1 is pivoted into its other operative position.

The externally geared spring barrel 35 of the camera spring motor permanently meshes with the spur gear 25. The spring motor is wound by a key 35' on the outside of the cassette 1 as is conventional. In the position of the apparatus illustrated, the driving power of the spring motor is transmitted from the barrel 35 through the spur gear 25, the engaged claws 27, 29, and the gear 31 to the driving or input gear 33 of a friction clutch 36 the output shaft of which is the keyed shaft 38 on which the core of the film spool 40 is mounted.

When the cassette 1 is inverted, the power of the spring motor is transmitted to the gear 25, thence to the meshing gear 26, the then engaged claws 28, 30, the spur gear 32, and from the latter to the input or driving gear 34 of a friction clutch 37 which drives the keyed shaft 39, and thereby actuates rotation of the spool 41 in the opposite direction to the previous direction of rotation of the spool 40. Mere inversion of the cassette 1 thus causes reversal of the direction of film winding and unwinding.

The camera is equipped with means which prevent the film from being completely unwound from its original spool 41 in a manner that would make it impossible to have it rewound thereon by simply reversing the direction of spool drive in the manner described above.

Figure 3:
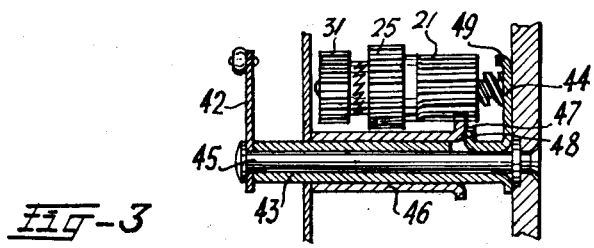
FIG. 3 shows another detail of the camera of FIG. 1 in partly sectional plan view.

The arresting mechanism for stopping film movement before the original spool is completely unwound is evident from joint consideration of FIGS. 1 and 3. The diameter of the roll of film F remaining on the original spool 41 is sensed by a feeler arm 42 which is fixedly fastened on a sleeve 43 rotatable on a fixed pin 45. The sleeve 43 fixedly carries an arresting arm 44 the free end of which has an abutment 49 the function of which will become presently apparent. A portion of the sleeve 43 is bent radially outward to form a projecting stop 48.

A gear segment 46 is rotatably mounted on the sleeve 43. Its gear teeth are engaged with the pinions 21, 22. A lug 47 on the segment 46 is axially aligned with the stop 48 on the sleeve 43.

When the film F is almost completely unwound from the spool 41, the feeler arm 42 which is shorter than the distance between its axis of rotation and the core of the spool 41 and is urged in the clockwise direction, as viewed on FIG. 1, by a light spring (not shown), swings freely past the core of the spool 41, and its movement is shared by the arresting arm 44, thus bringing the abutment 49 into the path of a stopping pin 50 on the bevel gear 51. When the pin 50 during rotary movement of the gear 51 reaches the abutment 49, the bevel gear 51, the coaxial spur gear 52, and the spring barrel 35 the gear ring of which meshes with the spur gear 52 are stopped. The immediately audible ensuing stoppage of the shutter and film transport mechanism provides a signal to the photographer.

When the cassette 1 is now inverted, the fixed eccentric disc 50 causes longitudinal displacement of the rack 20 which rotates the pinions 21, 22 as has been described above. The segment 46 which meshes with the pinions is rotated by the latter in such a manner that its lug 47 engages the projecting stop 48 on the sleeve 43, and thereby moves the arresting arm 44 out of the position shown in broken lines on FIG. 1 and in which its abutment 49 is in the path of pin 50 and thereby interferes with free movement of the bevel gear 51. The spring motor which was automatically stopped upon depletion of film F from the spool 41, is effective, upon the inversion of the cassette 1, to drive the spool 41 and thereby return the film from the spool 40 to the original spool 41. The feeler arm 42 rests on the film as it is again wound on the spool 41, and is gently pressed against the film by the light spring previously referred to. When the cassette 1 is again inverted, that is, returned to the position of FIG. 1, the consequent displacement of rack 20 and rotation of pinions 21 and 22 turns gear segment 46 to withdraw its lug 47 from stop 45.

The effects of the inversion of the cassette 1 on the exposure of the film F are best seen from FIG. 4 which shows the camera of the invention in front elevation. The cassette 1 is shown in fully drawn lines in the position illustrated in FIG. 1 in which the slot 16 is at the bottom of the camera and is engaged by the locking lever 7 whereas the slot 17 is at the top and inoperative. The path of the film through the gate plane is centered on a line which may be drawn through the centers of the slots 16 and 17. This line thus lies in the plane of symmetry in which the film will eventually be split to separate the two rows of frames. The lens system O and the optical axis of the camera are offset from this plane of symmetry toward the left as viewed in FIG. 4, and the film gate 70 is indicated in broken lines in the background of the lens. The optical axis is eccentric relative to the trunnion 2 which is centered in the axis of rotation of the cassette 1.

When the cassette 1 is pivoted out of the position shown in FIG. 1 after release of the locking lever 7 from the slot 16, the cassette may be rotated into the position indicated in broken lines in FIG. 4, and further into its second operative position in which the locking lever 7 engages the slot 17. A frame of the film F which originally occupied a position behind the gate 70 indicated in the background of the lens, is now located at 70′ at the other side of the plane of symmetry, and will not enter the field of projection of the lens O when the corresponding portion of the film F again is passed through the gate plane. One row of frames on the film F thus is exposed while the film is unwound from the spool 41 and wound on the take-up spool 40. Upon inversion of the cassette 1, the spring motor automatically transfers the film F back to the original spool 41 while the other row of frames is exposed through the lens O.

While the camera shown in FIGS. 1 to 4 has a frame 6 which encloses the cassette 1 on only three sides, namely at the top, the front, and the rear, the modified embodiment of the invention shown in FIG. 5 is equipped with a closed frame 6′ which completely surrounds the cassette 1. The cassette 1 is pivotable about an axis spaced from the optical axis of the lens O in the same manner as described above with reference to FIGS. 1 to 4, and its reversal affects the movement of the film and its exposure in the same manner. The cassette 1 is shown in FIG. 5 with its cover 1′ and a catch 1″ which normally holds the cover 1′ closed.

The frame 6′ is integral with a grip 62 similar in shape to a pistol grip. The camera may be held by the grip in a known manner during picture taking. The grip 62 has a recess 62′ in which a knurled nut 63 is partly engaged. The nut 63 is vertically movable in recess 62′ and is integral with an upstanding threaded pin 63′ which projects from the recess into alternative engagement in one of two threaded recesses provided respectively in the top (top recess not shown) and bottom of the cassette 1 for securing the cassette against rotation about its axis. No locking lever 7 is therefore required. A resilient cushion 64 is fastened to the back wall of the frame 6′ for abutment against the photographer's head when he views an object through the viewfinder eyepiece 13.

A portion of the frame 6′ is shown partly broken away to reveal the dials by means of which the automatic exposure controls can be adjusted for film speed and number of frames per second. As better seen in the rear elevational fragmentary view of FIG. 6, there are two concentric dials 60, 61 which are mounted in a portion of the frame 6′ covered by the cassette 1 when the same is in either one of its operative positions. The dials 60, 61 are accessible only when the cassette 1 is turned at approximately right angles to its operative positions. This avoids accidental changes in dial setting while the camera is being operated.

The electrical circuit which connects the photoelectric cell 11 with the non-illustrated diaphragm of the lens O for automatic exposure control is known in itself and needs no further description. The arrangement of dials which permit modification of circuit elements to adjust the automatic diaphragm setting to the sensitivity of the film exposed, briefly referred to as film speed, and to the exposure time as it results from adjustment of the number of frames exposed per second, is also known in itself. The dials may be linked with a sliding contact of a variable resistor or of a potentiometer to vary the value of one or several resistor elements in the circuit of the photoelectric cell as is conventional.

While the concealed dials 60, 61 have been illustrated in connection with the modified frame structure shown in FIG. 5, it is evident that such a dial arrangement is equally applicable to the frame 6 shown in FIGS. 1 to 4, and the use of exposure adjustment dials on the inside of frame 6 is specifically contemplated.

The motion picture camera according to the invention is adapted to be used with a permanently inserted cassette 1. Upon opening of the cover 1', the film strip on the spool 41 may be loaded in the cassette 1 and the first row of frames may be exposed with complete exposure of the whole sequence of frames being indicated by stoppage of the spring motor by means of the arresting arm 44. The cassette 1 is then released from its first operating position by manipulation of the locking lever 7 or the nut 63, turned through 180° as shown in FIG. 4 and refixed in the other operating position. Thereafter the other sequence of frames may be exposed.

The cassette 1 therefore need not be slipped off or detached from the frame 6 or 6' when sequentially exposing two rows of juxtaposed frames. It is only slipped off in case of insertion of another cassette holding unexposed film or a different type of film. Different films may be loaded in separate cassettes which may readily be interchanged, and the cassette interchange effect the principal function of the subject matter of the invention, that is, rotation of the cassette 1 through 180° when sequentially exposing two rows of juxtaposed frames without releasing the cassette 1 from the frame 6 or 6'.

The camera of the invention overcomes the shortcomings of the known cameras in which two rows of juxtaposed frames are to be exposed sequentially without intermediate handling of the film. The lens system including the diaphragm is mounted fixedly on the camera frame. This greatly simplifies the problem of automatic diaphragm control by means of a photoelectric cell and associated elements which are fixedly mounted on the same camera frame in the camera of this invention.

Inversion of the cassette does not affect those parts of the camera which are touched or handled by the photographer during the taking of motion pictures. Regardless of the direction of film movement in the cassette, the photographer grips the camera in the same way, for example, by the grip 62, looks through the single viewfinder eyepiece 13, and presses the release button or lever 9 to start exposure.

The elements of the camera mechanism which reverse the direction of film movement when the cassette is inverted are rugged, small, and light. They are not likely to fail in operation, and they do not add significantly to the overall bulk or weight of the camera as is best appreciated from inspection of FIG. 1.

The operation of the film reversing mechanism is very simple and requires but a simple movement, that is, rotation of the cassette through 180°. Since the cassette is releasably held in the frame and may readily be interchanged with another similar cassette holding another unexposed film or a different type of film, the camera of the invention, when equipped with several cassettes, thus combines all the well-established advantages of spool-loading and magazine-loading motion picture cameras.

It should be understood, of course, that the foregoing disclosure relates to only preferred embodiments of the invention, and that it is intended to cover all changes and modifications of the examples of the invention chosen herein for the purpose of the disclosure which do not constitute departures from the spirit and scope of the invention set forth in the appended claims.

What is claimed is:

1. In a motion picture camera, the combination
    (a) a support member in the form of a frame;
    (b) a cassette member having means mounting the same in said frame for rotation relative to the latter about a predetermined axis between two operative positions which are angularly offset relative to each other about said axis, said frame encompassing a major portion of the periphery of said cassette member in each of said operative positions of the latter;
    (c) lens means on said frame defining an optical axis which is parallel to said axis of rotation and passes through said cassette member in both of said operative positions of the latter; and
    (d) actuating means for moving a light sensitive film in said cassette member in a predetermined path having a portion defining a gate plane which transversely intersects said optical axis and axis of rotation in both of said operative positions, the points of intersection of said axes with said gate plane being spaced from each other.

2. A camera as set forth in claim 1, wherein said operative positions of said cassette member are offset relative to each other 180° about said axis of rotation.

3. A camera as set forth in claim 2 further comprising an elongated film arranged in said cassette member for movement along said path by said actuating means, said film when in said portion of said path having a longitudinal plane of symmetry transverse of said gate plane, said axis of rotation intersecting said gate plane adjacent said plane of symmetry, and said optical axis intersecting respective portions of said gate plane spaced in opposite directions from said plane of symmetry when said cassette member is in said two operative positions thereof.

4. A camera as set forth in claim 1 further comprising a release member movable on said frame, and motion transmitting means connecting said release member with said actuating means in said two operative positions of said cassette member for releasing movement of said film when said release member is moved.

5. A camera as set forth in claim 4, wherein said release member is accessible on said frame for manual operation.

6. A camera as set forth in claim 1 further comprising viewfinder means on said support member for viewing an object projected by said lens means along said optical axis.

7. A camera as set forth in claim 1, wherein said actuating means includes means for alternatively moving said film in said predetermined path in opposite directions, and cooperating control means on said frame and said cassette member for controlling the direction of film movement by said actuating means responsive to the operative position of said cassette member.

8. A camera as set forth in claim 1 further comprising means for locking said cassette member on said support member in said operative positions thereof.

9. A camera as set forth in claim 1, wherein said actuating means includes alternative drive means for moving said film in said predetermined path in opposite directions; a source of power for energizing said drive means; coupling means for selectively engaging said source with one of said drive means; and a control member fixed on said frame and operatively connected to said coupling means for engaging said source with respective ones of said drive means when said cassette member is in said operative positions thereof.

10. A camera as set forth in claim 1, further comprising light sensitive means on said support member for use in adjusting the effective aperture of said lens means responsive to the amount of light received by said light sensitive means; and adjusting means on said frame for varying the response of said light sensitive means to said amount of light, said adjusting means being covered by said cassette member when the same is in each of said operative positions thereof, and accessible when said cassette member is spaced from both operative positions thereof.

11. A camera as set forth in claim 1, wherein said actuating means includes a spool core mounted in said cassette member for rotation about a fixed axis and adapted to have said film wound thereon, drive means for rotating said core about said fixed axis, and arresting means including feeler arm means pivotable in said cassette about a pivoting axis toward and away from a position of contact with a film on said spool core, and an arresting member for arresting said drive means in a predetermined position of said feeler arm means.

12. A camera as set forth in claim 11, wherein the effective length of said feeler arm means is smaller than the spacing of said pivoting axis from said spool core, means urging said feeler means to move toward said spool core and to move past said spool core when the film wound on said core is reduced to a predetermined diameter, and said arresting member is connected to said feeler arm means for joint movement for arresting said drive means when said feeler arm means moves past said spool.

13. A camera as in claim 1; wherein said means mounting said cassette member on said frame are releasable from the latter.

14. In a motion picture camera, in combination,
  (a) a support member;
  (b) a cassette member having means mounting the same on said support member turning relative to the latter about an axis of rotation between first and second operative positions angularly offset 180° relative to each other about said axis;
  (c) lens means on said support member defining an optical axis substantially parallel to said axis of rotation and spaced therefrom;
  (d) an elongated light sensitive film in said cassette member having first and second laterally juxtaposed rows of frames thereon; and
  (e) actuating means for moving said film in said cassette member in a predetermined path, a portion of said path defining a plane substantially perpendicular to said axes, said optical axis intersecting said first and second rows of frames in said path portion when said cassette member is in said first and second operative positions, respectively.

15. A motion picture camera as set forth in claim 14, wherein said actuating means includes means for reversing the direction of movement of said film in said path when said cassette member moves from one to the other of said operative positions thereof.

16. A camera as set forth in claim 15, wherein said reversing means includes rack means movable in said cassette member; cooperating motion transmitting means on said cassette member and on said support member for reciprocably moving said rack means between two positions in said cassette member respectively corresponding to said first and second operative positions of said cassette member; two rotatable pinion means meshing with said rack means; two coupling actuators operatively connected to respective ones of said pinion means for linear movement in opposite directions when said two pinion means are rotated by said rack means; a source of driving power; two drive elements for moving said film in said path in opposite directions; and two coupling means respectively responsive to movement of said coupling actuators in one of said opposite directions for coupling said source of driving power to said drive elements.

17. A camera as in claim 14; wherein said means mounting the cassette member on said support member are releasable from the latter.

References Cited by the Examiner
UNITED STATES PATENTS

| | | | |
|---|---|---|---|
| 2,293,195 | 8/42 | Cohen | 88—17 X |
| 3,017,803 | 1/62 | Sakaki | 88—17 X |

FOREIGN PATENTS 475,648  11/37  Great Britain.

LEO SMILOW, *Primary Examiner.*

G. Y. CUSTER, ROBERT S. WARD, JR., *Examiners.*